United States Patent
Eiraku

(10) Patent No.: US 7,856,305 B2
(45) Date of Patent: Dec. 21, 2010

(54) CONTROL SYSTEM AND CONTROL METHOD FOR INTERNAL COMBUSTION ENGINE

(75) Inventor: Akira Eiraku, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 532 days.

(21) Appl. No.: 11/990,767

(22) PCT Filed: Aug. 14, 2006

(86) PCT No.: PCT/IB2006/002211

§ 371 (c)(1),
(2), (4) Date: Feb. 21, 2008

(87) PCT Pub. No.: WO2007/023345

PCT Pub. Date: Mar. 1, 2007

(65) Prior Publication Data

US 2009/0250037 A1    Oct. 8, 2009

(30) Foreign Application Priority Data

Aug. 22, 2005   (JP) .............................. 2005-240077

(51) Int. Cl.
*F02D 41/00* (2006.01)
*F02D 9/08* (2006.01)
*F02M 7/00* (2006.01)
*G06F 19/00* (2006.01)

(52) U.S. Cl. ...................... 701/103; 123/396; 123/399; 123/403; 701/110

(58) Field of Classification Search ......... 701/101–105, 701/107, 110–115; 123/399–403, 350, 361, 123/370, 371, 376, 396, 398

See application file for complete search history.

(56) References Cited

U.S. PATENT DOCUMENTS

| | | | |
|---|---|---|---|
| 4,854,283 A * | 8/1989 | Kiyono et al. .............. 123/361 |
| 4,971,011 A | 11/1990 | Nanyoshi et al. | |
| 5,225,982 A * | 7/1993 | Ito et al. ....................... 701/91 |
| 5,629,852 A * | 5/1997 | Yokoyama et al. .......... 701/101 |
| 5,722,363 A * | 3/1998 | Iida et al. .................... 123/305 |
| 5,758,309 A * | 5/1998 | Satoh ......................... 701/108 |
| 6,003,489 A * | 12/1999 | Kamura et al. .............. 123/305 |
| 6,173,694 B1 * | 1/2001 | Kamura et al. .............. 123/305 |

(Continued)

FOREIGN PATENT DOCUMENTS

| | | |
|---|---|---|
| EP | 0 556 873 A2 | 8/1993 |
| EP | 0 787 897 A2 | 8/1997 |
| EP | 1 384 875 A2 | 1/2004 |
| JP | A 61-25938 | 2/1986 |
| JP | A 1-111543 | 4/1989 |
| JP | A 9-310637 | 12/1997 |
| JP | A 2000-120468 | 4/2000 |

*Primary Examiner*—Willis R. Wolfe, Jr.
*Assistant Examiner*—Johnny H Hoang
(74) *Attorney, Agent, or Firm*—Oliff & Berridge, PLC

(57) ABSTRACT

A control system for an internal combustion engine calculates a provisional target value of the throttle opening in accordance with an accelerator pedal travel, upon detection of a sudden operation of the accelerator pedal. The system also calculates a target pressure change in the surge tank according to the provisional target value, on the basis of the actual surge tank pressure and the cylinder intake mass airflow, using a virtual intake system model. The control system sets a target throttle opening in accordance with the surge tank pressure and the cylinder intake mass airflow, so as to provide the target pressure change under a condition of the actual surge tank volume.

5 Claims, 4 Drawing Sheets

U.S. PATENT DOCUMENTS

| | | | |
|---|---|---|---|
| 6,293,249 B1* | 9/2001 | Kuretake | 123/399 |
| 6,497,212 B2* | 12/2002 | Matsumoto et al. | 123/295 |
| 6,561,162 B2* | 5/2003 | Kuretake | 123/399 |
| 6,691,675 B2* | 2/2004 | Kidokoro et al. | 123/329 |
| 2001/0045207 A1* | 11/2001 | Mashiki et al. | 123/480 |
| 2002/0014363 A1* | 2/2002 | Kubota et al. | 180/197 |
| 2002/0139348 A1* | 10/2002 | Kuretake | 123/399 |
| 2002/0174850 A1* | 11/2002 | Kanai | 123/336 |
| 2003/0010020 A1* | 1/2003 | Taga et al. | 60/285 |
| 2005/0097888 A1* | 5/2005 | Miyashita | 60/602 |
| 2005/0241617 A1* | 11/2005 | Kojima | 123/446 |
| 2006/0075996 A1* | 4/2006 | Yoshino et al. | 123/568.14 |

* cited by examiner

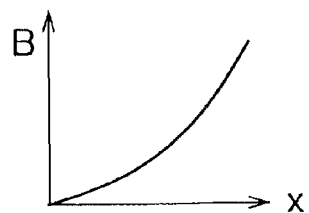
FIG. 3
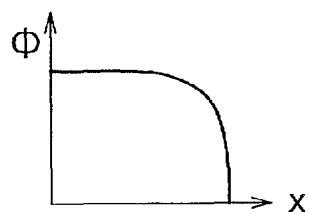
FIG. 4
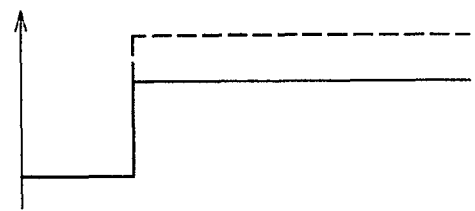
FIG.5A  ACCELERATOR PEDAL TRAVEL
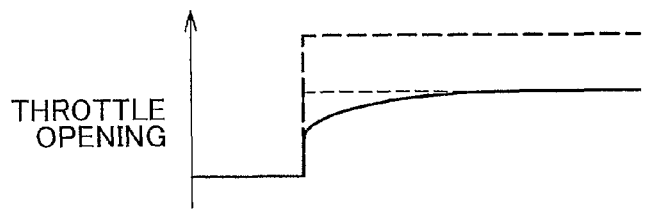
FIG.5B  THROTTLE OPENING
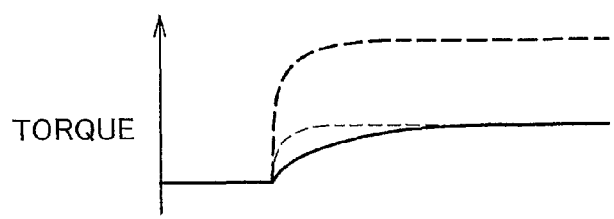
FIG.5C  TORQUE
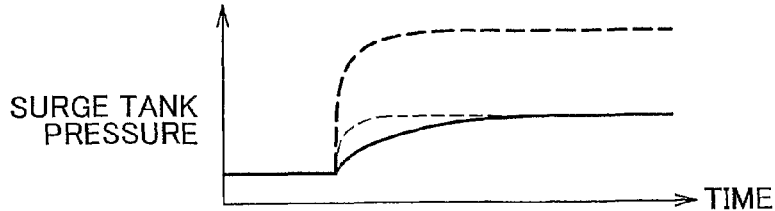
FIG.5D  SURGE TANK PRESSURE

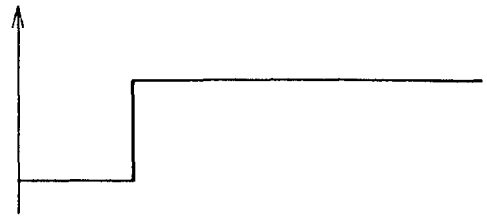
FIG.8A  ACCELERATOR PEDAL TRAVEL
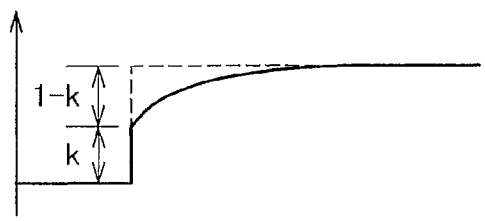
FIG.8B  THROTTLE OPENING
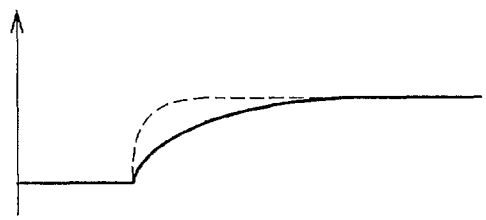
FIG.8C  TORQUE
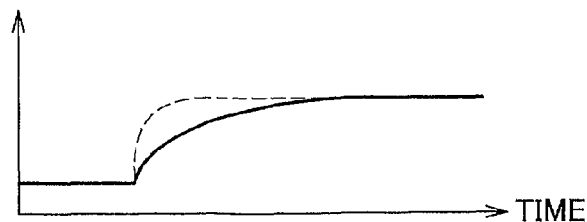
FIG.8D  SURGE TANK PRESSURE

CONTROL SYSTEM AND CONTROL METHOD FOR INTERNAL COMBUSTION ENGINE

TECHNICAL FIELD

The invention generally relates to control technologies for internal combustion engines, and particularly relates to throttle control technologies for improving the torque characteristics of the engine in response to the operation of the accelerator pedal.

BACKGROUND ART

In the case of an internal combustion engine having a surge tank located downstream of a throttle valve, the torque response to the operation of the accelerator pedal is determined depending on the volume of the surge tank. More specifically, as the volume of the surge tank is larger, pressure changes in the surge tank in response to changes in the throttle flow are reduced, and changes in the torque are also reduced. Namely, the torque response to the operation of the accelerator pedal slows down. On the contrary, as the surge tank volume is smaller, pressure changes in the surge tank are increased, and, therefore, the torque response speeds up.

Accordingly, if it is desired to vary the torque response to the accelerator pedal operation depending on operating conditions of the vehicle, such as the operation amount or speed of the accelerator pedal, vehicle speed, and/or the change gear ratio of the transmission, the volume of the surge tank may be changed in accordance with the operating conditions of the vehicle. However, making the surge tank volume variable renders the engine system complicated in construction, resulting in an increase of the manufacturing cost. Thus, it has been desired to provide technologies for allowing variations in the torque response to the accelerator pedal operation while keeping the surge tank volume constant, namely, without changing the surge tank volume.

For example, Japanese Laid-open Patent Publication No. H1-111543 discloses an engine control system in which the operation amount or travel of the accelerator pedal is processed by means of a first-order lag filter to provide a throttle opening, and the time constant of the first-order lag filter is varied depending on the shifting conditions of the transmission or the operation speed of the accelerator pedal. If the time constant is set to a small value, changes in the throttle opening are made highly responsive to the operation amount of the accelerator pedal, and the torque response can be enhanced. If the time constant is set to a large value, on the other hand, a delay in the response to the accelerator pedal operation is increased, and torque shock can be reduced.

However, if the throttle opening is derived from the accelerator pedal operation amount through processing with the first-order lag filter, the throttle opening does not change stepwise but changes gradually even when the accelerator pedal operation amount changes stepwise. While the torque of the internal combustion engine changes with pressure changes in the surge tank, the surge tank pressure does not change unless the throttle flow changes. Thus, with the technology as disclosed in the above-identified publication, a substantially no-response time appears during which the torque does not respond to the accelerator pedal operation, thus making it difficult or impossible to provide ideal torque response as provided in the case where the surge tank volume can be varied.

DISCLOSURE OF INVENTION

It is therefore an object of the invention to provide a control system and a control method for an internal combustion engine, which can vary the torque response to the operation of the accelerator pedal depending on the operating conditions of the vehicle.

To accomplish the above and/or other object(s), there is provided according to one aspect of the invention a control system for an internal combustion engine, comprising: (a) accelerator operation amount measuring means for measuring an operation amount of an accelerator, (b) target throttle opening calculating means for calculating a target value of a throttle opening in accordance with the accelerator operation amount, (c) sudden operation detecting means for detecting a sudden operation of the accelerator, (d) operating condition acquiring means for acquiring at least one operating condition of the vehicle, and (e) throttle control means for setting a corrected target value obtained by correcting the target value in accordance with the at least one operating condition of the vehicle as an initial value when a sudden operation of the accelerator is detected, and gradually changing the throttle opening from the corrected target value as the initial value to the target value.

According to the above aspect of the invention, when a sudden operation of the accelerator is detected, the throttle opening is not set to the target value determined from the accelerator operation amount, but is initially set to the corrected target value obtained by correcting the target value in accordance with the vehicle operating condition(s) and is then gradually changed from the corrected target value to the target value. As a result, the amount of air drawn into the cylinders of the engine changes in accordance with the operating conditions of the vehicle, and the torque response to the accelerator operation can be made suitable for the operating conditions of the vehicle. For example, if the corrected target value is set to a smaller value than the original target value, the control system can reduce the speed of torque response to the accelerator operation. If the corrected target value is set to a larger value than the original target value, on the other hand, the control system can increase the speed of torque response to the accelerator operation.

In one embodiment of the invention, the throttle control means includes (f) means for measuring or estimating an actual pressure in a surge tank, (g) means for measuring or estimating a cylinder intake mass airflow as an amount of air drawn from the surge tank into cylinders of the engine, (h) means, including a virtual intake system model having a virtual surge tank volume, for calculating a target pressure change in the surge tank according to the target value of the throttle opening, on the basis of the measured or estimated actual surge tank pressure and the cylinder intake mass airflow, using a relationship between the throttle opening and a pressure change in the surge tank in the virtual intake system model, and (i) means for setting the virtual surge tank volume in accordance with the at least one operating condition of the vehicle. Upon detection of a sudden operation of the accelerator, the throttle control means controls the throttle opening in accordance with the measured or estimated surge tank pressure and the cylinder intake mass airflow, so as to provide the target pressure change in the surge tank under a condition of an actual volume of the surge tank, thereby to gradually change the throttle opening from the initial value determined depending on the virtual surge tank volume to the target value.

In the case of an internal combustion engine having a surge tank located downstream of the throttle valve, the torque response to the accelerator operation is determined depending on how the pressure in the surge tank changes. According to the above-described embodiment of the invention, the throttle opening is controlled on the basis of a pressure change in the surge tank obtained in the virtual intake system model as a target pressure change, so that the engine can provide substantially the same torque response as an internal combustion engine (virtual engine) having the virtual intake system model. Since the torque response to the accelerator operation in the engine having the virtual intake system model is determined based on the virtual surge tank volume, it is possible to slow down the torque response to the accelerator operation by setting the virtual surge tank volume to a relatively large value. In this case, the initial value (corrected target value) of the throttle opening is set to a smaller value than the original target value. On the contrary, it is possible to speed up the torque response to the accelerator operation by setting the virtual surge tank volume to a relatively small value. In this case, the initial value (corrected target value) of the throttle opening is set to a larger value than the original target value.

According to one feature of the embodiment as described above, the throttle control means further includes means for measuring or estimating an intake air pressure at a location upstream of a throttle valve, and controls the throttle opening in view of the measured or estimated upstream intake air pressure. With this feature, the upstream intake air pressure, as well as other operating conditions of the vehicle, is considered as a parameter for controlling the throttle opening. Thus, even in the case where the upstream intake air pressure changes, for example, in an internal combustion engine equipped with a supercharger, the throttle control can be accurately performed so as to provide torque characteristics suitable for or appropriate to the operating conditions of the vehicle.

In another embodiment of the above aspect of the invention, the throttle control means calculates the corrected target value by multiplying the target value by a correction factor that is set in accordance with the at least one operating condition of the vehicle.

According to the above-described embodiment, it is possible to slow down the torque response to the accelerator operation by setting the correction factor to a value that is smaller than 1. On the contrary, it is possible to speed up the torque response to the accelerator operation by setting the correction factor to a value that is larger than 1. The correction factor is set in accordance with the operating conditions of the vehicle, so that the engine can provide torque characteristics suitable for or appropriate to the operating conditions of the vehicle.

According to one feature of the embodiment as described just above, the throttle control means gradually changes the throttle opening from the corrected target value to the target value by processing a difference between the target value and the corrected target value by means of a first-order lag filter, while setting a time constant of the first-order lag filter in accordance with the at least one operating condition of the vehicle.

With the above-described feature, it is possible to reduce the rate of change of the throttle opening by setting the time constant of the first-order lag filter to a relatively large value, and it is also possible to increase the rate of change of the throttle opening by setting the time constant of the first-order lag filter to a relatively small value. The time constant is set in accordance with the operating conditions of the vehicle, so that the engine can provide torque characteristics that are more suitable for the operating conditions of the vehicle.

BRIEF DESCRIPTION OF DRAWINGS

The foregoing and/or further objects, features and advantages of the invention will become more apparent from the following description of exemplary embodiments with reference to the accompanying drawings, in which like numerals are used to represent like elements and wherein:

FIG. 3 is a graph indicating the relationship between function B and variable x;

FIG. 4 is a graph indicating the relationship between function φ and variable x;

FIG. 5 is a view showing the result of throttle control in the case where a target throttle opening is calculated by a method according to the first embodiment of the invention;

FIG. 8 is a view showing the result of throttle control in the case where a target throttle opening is calculated by a method according to the second embodiment of the invention.

MODES FOR CARRYING OUT THE INVENTION

First Embodiment

Referring to FIG. 1 through FIG. 6, a first exemplary embodiment of the invention will be described in detail.

Figure 1:
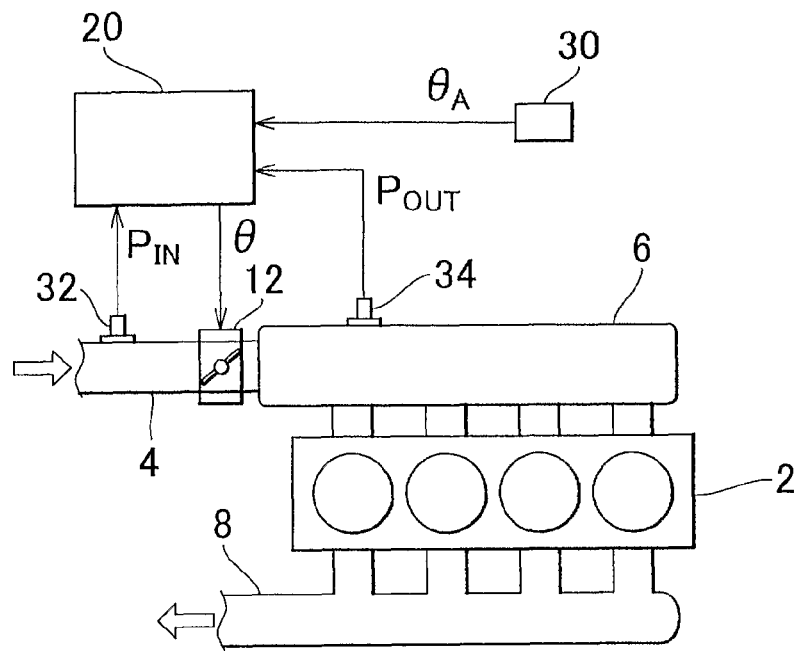
FIG. 1 is a schematic view of an internal combustion engine to which a control system according to a first embodiment of the invention is applied.

FIG. 1 schematically shows an internal combustion engine (hereinafter simply referred to as "engine") to which a control system according to the first embodiment of the invention is applied. As shown in FIG. 1, the engine has an engine body 2 to which an intake passage 4 and an exhaust passage 8 are connected. A surge tank 6 is formed in the intake passage 4. In operation, air is distributed from the surge tank 6 to the respective cylinders of the engine body 2. An electronically controlled throttle valve 12 is disposed upstream of the surge tank 6 in the intake passage 4.

The engine of FIG. 1 includes an ECU (Electronic Control Unit) 20 for controlling the operation of the engine. Various devices or equipment including, for example, the throttle valve 12 are connected to the output side of the ECU 20, and various sensors are connected to the input side of the ECU 20. In the engine, a downstream intake air pressure sensor 34 is mounted in the surge tank 6. The downstream intake air pressure sensor 34 generates a signal indicative of the pressure (surge tank pressure) $P_{OUT}$ downstream of the throttle valve 12. An upstream intake air pressure sensor 32 that generates a signal indicative of the pressure $P_{IN}$ upstream of the throttle valve 12 is disposed upstream of the throttle valve 12 in the intake passage 4. In addition, an accelerator pedal position sensor 30 that generates a signal indicative of the travel or operation amount $\theta_A$ of the accelerator pedal is provided. While the ECU 20 is connected to a plurality of devices and sensors other than the above-indicated devices and sensors, no further explanation will be provided herein. The ECU 20 is adapted to drive the respective devices according to certain control programs, based on the outputs of the respective sensors.

The ECU 20 serving as a control unit of the engine performs throttle control, as one of its functions, for controlling the opening of the throttle valve 12 in accordance with the accelerator pedal travel $\theta_A$. In this embodiment, the throttle opening is controlled so that the torque response to the operation of the accelerator pedal can vary with the accelerator pedal travel $\theta_A$.

The throttle control according to the first embodiment uses a virtual air intake system model having a virtual surge tank volume, and the throttle valve 12 is controlled on the basis of a change in the surge tank pressure obtained in the virtual intake system model as a target pressure change. The response of torque to the accelerator pedal operation is determined depending on how the surge tank pressure changes, and changes in the surge tank pressure depend on the volume of the surge tank 6. Accordingly, if the virtual surge tank volume is set in accordance with the accelerator pedal travel $\theta_A$, the surge tank pressure in the virtual intake system model changes in accordance with the accelerator pedal travel $\theta_A$. Thus, the torque response commensurate with the accelerator pedal travel $\theta_A$ can be realized by controlling the throttle valve 12 on the basis of the pressure change in the surge tank in the virtual intake system model as the target pressure change.

Figure 2:
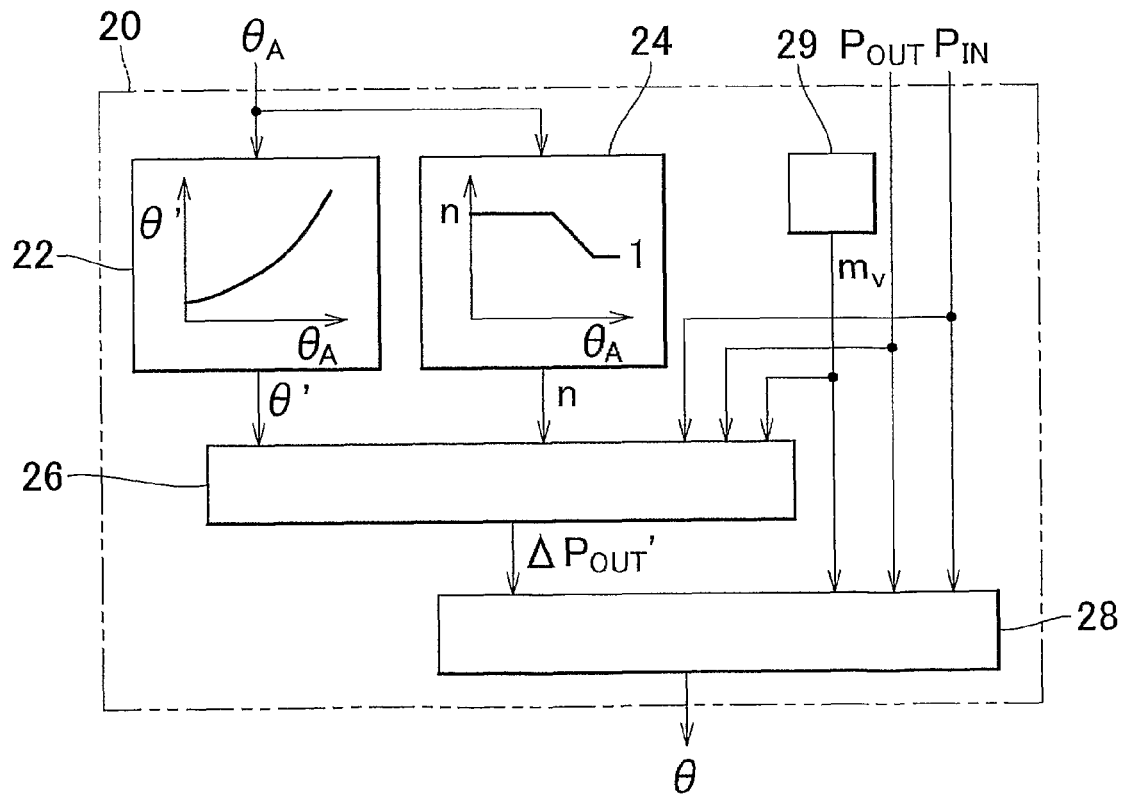
FIG. 2 is a block diagram useful for explaining the operation of ECU during throttle control in the first embodiment of the invention.

The operation of the ECU 20 during throttle control may be explained with reference to the block diagram of FIG. 2. As shown in FIG. 2, the ECU 20 operates, during throttle control, as a first computing unit 22 that calculates a provisional target throttle opening, a second computing unit 24 that sets a virtual surge tank volume coefficient of the virtual intake system model, a third computing unit 29 that calculates the amount of intake air drawn into the cylinders (which will be called "cylinder intake mass airflow" when appropriate), a fourth computing unit 26 that calculates a target pressure change in the surge tank 6 using the virtual intake system model, and a fifth computing unit 28 that calculates a target throttle opening.

When a sudden operation of the accelerator pedal is detected from a signal of the accelerator pedal position sensor 30, the ECU 20 initially operates as the first computing unit 22. The ECU 20 has a map that defines the relationship between the accelerator pedal travel $\theta_A$ and the throttle opening $\theta'$ in a steady state. This map has been used in conventional throttle control for determining a target throttle opening from the accelerator pedal travel. In the conventional throttle control, a throttle opening $\theta'$ corresponding to the accelerator pedal travel $\theta_A$ is read from the map, and the throttle opening $\theta'$ itself is set as the target throttle opening. In the throttle control according to this embodiment, on the other hand, the ECU 20 obtains the throttle opening $\theta'$ corresponding to the travel $\theta_A$ of the accelerator pedal that has been suddenly operated, with reference to the map, and the thus obtained throttle opening $\theta'$ is set as a provisional target throttle opening, rather than the target throttle opening.

The ECU 20 also operates as the second computing unit 24 while at the same time operating as the first computing unit 22. The ECU 20 has a map that defines the relationship between the accelerator pedal travel $\theta_A$ and the virtual surge tank volume coefficient n. The virtual surge tank volume coefficient n is the ratio of the volume of the surge tank in the virtual intake system model to the volume of the surge tank 6 of the actual engine. If n>1, the virtual surge tank volume is larger than the actual surge tank volume. If n<1, the virtual surge tank volume is smaller than the actual surge tank volume. If n=1, the virtual surge tank volume is equal to the actual surge tank volume. In the present embodiment, n is set to be larger than 1 when the accelerator pedal travel $\theta_A$ is relatively small, and n is set to 1 when the accelerator pedal travel $\theta_A$ is relatively large, as shown in FIG. 2. The ECU 20 sets the virtual surge tank volume coefficient n in accordance with the travel $\theta_A$ of the accelerator pedal that has been suddenly operated, with reference to this map.

After operating as the first computing unit 22 and the second computing unit 24, the ECU 20 operates as the third computing unit 29, fourth computing unit 26 and the fifth computing unit 28. The ECU 20, when operating as the third computing unit 29, calculates the amount of air drawn from the surge tank 6 into the cylinders of the engine body 2 (or cylinder intake mass airflow) $m_v$ (g/sec), based on the engine speed, pressures in the cylinders, valve timing and other parameters. The cylinder intake mass airflow $m_v$ thus calculated will be used in the calculations of the fourth computing unit 26 and the fifth computing unit 28.

The ECU 20, when operating as the fourth computing unit 26, calculates a target pressure change in the surge tank 6, using the above-described virtual intake system model. A change $\Delta P_{OUT}'$ in the surge tank pressure in the virtual intake system model can be expressed by Eq. (1) as indicated below, using the cylinder intake mass airflow $m_v$, throttle flow rate $m_t'$ and the virtual surge tank volume coefficient n. The amount of air calculated in the third computing unit 29 is assigned to the cylinder intake mass airflow $m_v$, and the value set in the second computing unit 24 is assigned to the virtual surge tank volume coefficient n. In Eq. (1), $V_m$ is the volume of the surge tank 6, and T is the temperature of air in the surge tank 6.

$$\Delta P_{OUT}' = (m_t' - m_v) \frac{RT}{nV_m} \qquad (1)$$

The throttle flow rate $m_t'$ of the virtual intake system model, which is used in the above equation (1), can be calculated by substituting the throttle opening $\theta'$, the downstream intake air pressure $P_{OUT}$ and the upstream intake air pressure $P_{IN}$ into Eq. (2) known as a nozzle formula as indicated below. In Eq. (2), the provisional target throttle opening $\theta'$ set in the first computing unit 22 is assigned to the throttle opening $\theta'$. Also, the downstream intake air pressure $P_{OUT}$ is a pressure actually measured by the downstream intake air pressure sensor 34, and the upstream intake air pressure $P_{IN}$ is a pressure actually measured by the upstream intake air pressure sensor 32.

$$m_t' = P_{IN} B(\theta') \phi\left(\frac{P_{OUT}}{P_{IN}}\right) \qquad (2)$$

In the above equation (2), B is a function of the throttle opening including the flow coefficient, and has a certain relationship with variable x as shown in FIG. 3, and $\phi$ is a function as expressed by Eq. (3) as indicated below, and has a certain relationship with variable x as shown in FIG. 4. In Eq. (3), k is the ratio of specific heat.

$$\phi(x) = x^{\frac{1}{k}} \sqrt{\frac{2k}{k-1}\left(1 - x^{\frac{k-1}{k}}\right)}, \; x > \left(\frac{2}{k+1}\right)^{\frac{k}{k-1}} \qquad (3)$$

$$\phi(x) = \left(\frac{2}{k+1}\right)^{\frac{1}{k-1}} \sqrt{\frac{2k}{k-1}}, x \leq \left(\frac{2}{k+1}\right)^{\frac{k}{k-1}}$$

The torque response to the accelerator pedal operation is determined depending on how the surge tank pressure changes. In order for the engine of FIG. 1 to achieve substantially the same torque response as the engine having the virtual intake system model, the throttle valve 12 may be controlled so that the actual pressure in the surge tank 6 changes substantially in the same manner as the surge tank pressure in the virtual intake system model. Namely, the throttle valve 12 may be controlled on the basis of a change in the surge tank pressure in the virtual intake system model as a target pressure change. Thus, the ECU 20 sets the surge tank pressure change $\Delta P_{OUT}'$ expressed by the above equation (1) as the target pressure change.

Next, the ECU 20 operates as the fifth computing unit 28. A pressure change $\Delta P_{OUT}$ in the surge tank 6 of the engine of FIG. 1 can be expressed by Eq. (4) as indicated below, using the cylinder intake mass airflow $m_v$ and the throttle flow rate $m_t$. The amount of air calculated in the third computing unit 29 is assigned to the cylinder intake mass airflow $m_v$.

$$\Delta P_{OUT} = (m_t - m_v)\frac{RT}{V_m} \quad (4)$$

The throttle flow rate $m_t$ used in the above equation (4) depends on the opening of the throttle valve 12. Where θ represents the throttle opening set in the engine of FIG. 1, the throttle flow rate $m_t$ can be expressed by Eq. (5) as indicated below, using the downstream intake air pressure $P_{OUT}$ and the upstream intake air pressure $P_{IN}$ measured by the respective sensors 34, 32.

$$m_t = P_{IN} B(\theta) \phi\left(\frac{P_{OUT}}{P_{IN}}\right) \quad (5)$$

In order for the engine of FIG. 1 to achieve substantially the same torque response as the engine having the virtual intake system model, the pressure change $\Delta P_{OUT}$ in the surge tank 6 needs to be made equal to the target pressure change $\Delta P_{OUT}'$. Namely, the following equation (6) needs to be satisfied.

$$\Delta P_{OUT} = \Delta P_{OUT}' \quad (6)$$

To satisfy the above equation (6), the throttle flow rate $m_t$ in the engine of FIG. 1 may be controlled so as to satisfy the following equation (7) in relation to the throttle flow rate $m_t'$ of the virtual intake system model.

$$m_t = m_t' + \frac{1-n}{n}(m_t' - m_v) \quad (7)$$

The throttle opening θ that satisfies the above equation (7) can be obtained according to Eq. (8) as indicated below. In Eq. (8), $B^{-1}$ is an inverse function of B. The ECU 20 sets the throttle opening θ calculated according to Eq. (8) as the target throttle opening.

$$\theta = B^{-1}\left(\frac{m_t}{P_{IN}} / \phi\left(\frac{P_{OUT}}{P_{IN}}\right)\right) \quad (8)$$

The ECU 20 controls the throttle valve 12 in accordance with the target throttle opening θ calculated in the manner as described above. The result of the throttle control performed by the ECU 20 is shown in FIG. 5. In FIG. 5, changes in the throttle opening (B), torque (C) and the surge tank pressure (D) are plotted against changes in the accelerator pedal travel (A) during acceleration, for comparison between the throttle control according to this embodiment and the conventional throttle control. In FIG. 5, thick solid lines indicate the result of the throttle control performed by the engine according to this embodiment under soft acceleration (i.e., when the vehicle is slowly accelerated), and thin broken lines indicate the result of the conventional throttle control under soft acceleration. Also in FIG. 5, thick broken lines indicate the result of throttle control performed by the engine according to this embodiment under hard acceleration (i.e., when the vehicle is rapidly accelerated).

In the throttle control of the engine according to the first embodiment, the virtual intake system model having the virtual surge tank volume is used, and the throttle valve 12 is controlled on the basis of a change in the surge tank pressure obtained in the virtual intake system model as a target pressure change, as described above. According to this control, the initial value of the target throttle opening θ set upon depression of the accelerator pedal is not the throttle opening (provisional target throttle opening) θ' set in accordance with the accelerator pedal travel $\theta_A$, but a value obtained by correcting the provisional target throttle opening θ' using the virtual intake system model. The initial value of the target throttle opening θ is determined depending on the virtual surge tank volume coefficient n of the virtual intake system model, and the throttle opening is gradually changed from the initial value (corrected target value) determined depending on the virtual surge tank volume coefficient n to the final target value (which is equal to the provisional target throttle opening θ').

In the case where the virtual surge tank volume coefficient n is set to be larger than 1, namely, under soft acceleration with the travel of the accelerator pedal when depressed being relatively small, the throttle valve 12 is opened, upon depression of the accelerator pedal, by a smaller degree (as indicated by the thick solid line in graph (B) of FIG. 5) than the throttle opening (indicated by the thin broken line in graph (B) of FIG. 5) established under the conventional throttle control. Then, the opening of the throttle valve 12 is gradually increased up to the throttle opening established under the conventional throttle control. This is because the throttle opening is controlled on the basis of a change in the surge tank pressure in an engine (i.e., a virtual engine model) having a large surge tank volume as a target pressure change.

By setting the initial throttle opening to a small value at the time of depression of the accelerator pedal, the engine of this embodiment is able to suppress an increase of the throttle flow immediately after depression of the accelerator pedal, and exhibits a gentle or low-speed increase of the surge tank pressure, like the engine having a large surge tank volume. As a result, the torque response to the operation of the accelerator pedal slows down, and torque shock can be reduced. The throttle valve 12 is then gradually opened from the initial throttle opening set to the small value, toward the intended throttle opening (provisional target throttle opening θ') corresponding to the accelerator pedal travel. Thus, the engine of this embodiment is able to finally provide torque commensurate with the accelerator pedal travel, namely, torque desired by the driver.

In the throttle control of the engine under hard acceleration, on the other hand, the throttle valve 12 is opened by substantially the same degree as the throttle opening provided in the conventional engine, from the time of depression of the accelerator pedal. This is because, when the vehicle is rapidly accelerated, namely, when the travel of the accelerator pedal when depressed is relatively large, the virtual surge tank volume coefficient n is set to 1, and, therefore, the target throttle opening θ determined according to Eq. (8) becomes equal to the provisional target throttle opening θ' set in accordance with the accelerator pedal travel $θ_A$. In this case, the throttle valve 12 is opened to the intended throttle opening corresponding to the accelerator pedal travel from the time immediately after depression of the accelerator pedal, so that the surge tank pressure rises quickly. As a result, the engine of this embodiment exhibits substantially the same torque response to the accelerator pedal operation as the conventional engine, thus meeting the driver's demand for acceleration.

While the minimum value of the virtual surge tank volume coefficient n is set to 1 in the illustrated embodiment, the coefficient n may be set to a value smaller than 1. For example, in the map used in the second computing unit 24, n may be set to be larger than 1 (n>1) when the accelerator pedal travel $θ_A$ is relatively small, and n may be set to be equal to 1 (n=1) when the accelerator pedal travel $θ_A$ is in the vicinity of the middle value, while n may be set to be smaller than 1 (n<1) when the accelerator pedal travel $θ_A$ is relatively large.

Figure 6:
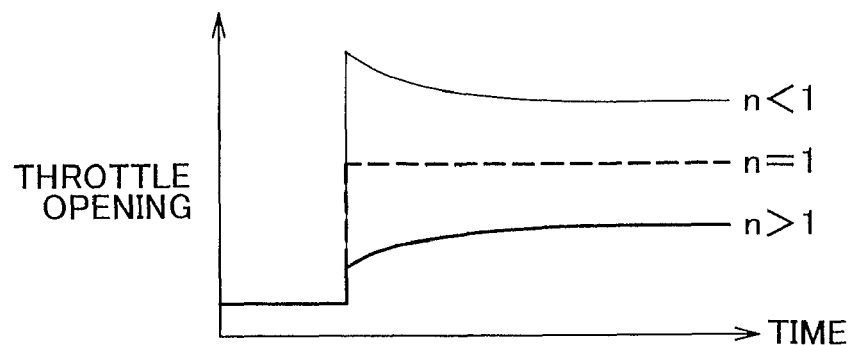
FIG. 6 is a graph indicating the relationship between a set value of a virtual surge tank volume coefficient n and changes in the throttle opening with time after a sudden operation of the accelerator pedal.

When the virtual surge tank volume coefficient n is set to be smaller than 1, the throttle valve 12 is initially opened by a large degree upon depression of the accelerator pedal, and the opening of the throttle valve 12 is gradually reduced to the intended throttle opening (provisional throttle opening θ') commensurate with the accelerator pedal travel, as shown in FIG. 6. This is because the throttle opening is controlled on the basis of a change in the surge tank pressure obtained in an engine (i.e., a virtual engine model) having a small surge tank volume as a target pressure change. In this case, the initial throttle opening at the time of depression of the accelerator pedal is set to a large value, so that the throttle flow immediately after depression of the accelerator pedal can be increased, resulting in a rapid increase in the surge tank pressure as in the engine having a small surge tank volume. Thus, the torque response to the accelerator pedal operation can be improved.

Second Embodiment

Figure 7:
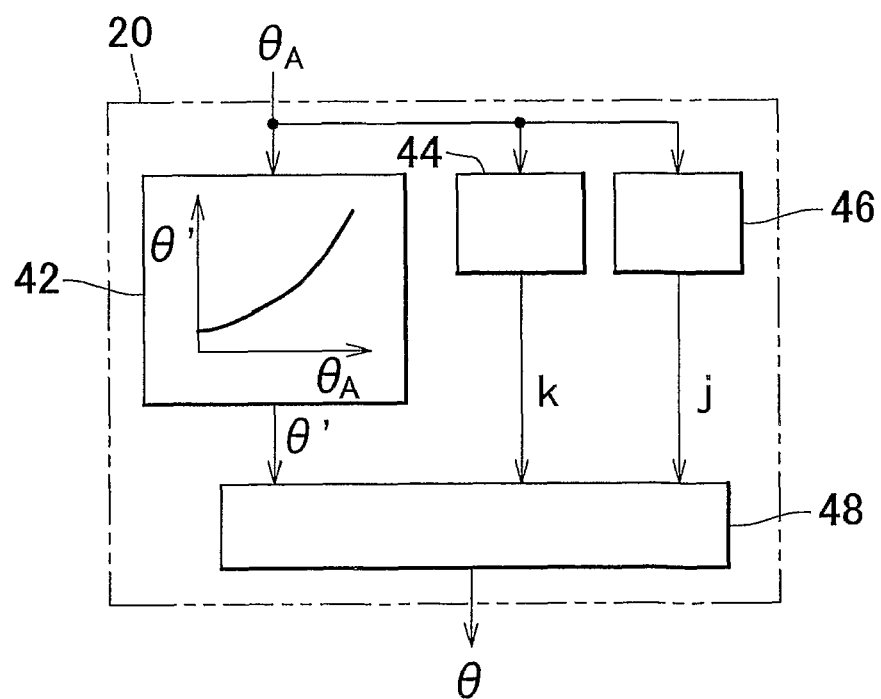
FIG. 7 is a block diagram useful for explaining the operation of ECU during throttle control in a second embodiment of the invention.

Referring next to FIG. 7 and FIG. 8, a second exemplary embodiment of the invention will be described in detail. In the control system according to this embodiment of the invention, which is applied to the internal combustion engine constructed as shown in FIG. 1, the ECU 20 operates in the manners as described below with reference to the block diagram of FIG. 7, instead of operating according to the block diagram of FIG. 2.

The block diagram of FIG. 7 shows the operation of the ECU 20 when it performs throttle control according to the second embodiment of the invention. In the second embodiment, the ECU 20 operates, during throttle control, as a first computing unit 42 that calculates a provisional target throttle opening, a second computing unit 44 that sets a correction factor, a third computing unit 46 that sets a filter factor of a first-order lag filter (or a time lag filter of first order), and a fourth computing unit 48 that calculates a target throttle opening, as shown in FIG. 7.

When a sudden operation of the accelerator pedal is detected from a signal of the accelerator pedal position sensor 30, the ECU 20 initially operates as the first computing unit 42. The operation of the ECU 20 as the first computing unit 42 is identical with that of the ECU 20 as the first computing unit 22 according to the first embodiment. Namely, the ECU 20 obtains a throttle opening θ' according to the travel or operation amount $θ_A$ of the accelerator pedal that has been suddenly operated, with reference to the map as shown in FIG. 7, and sets the throttle opening θ' as a provisional target throttle opening.

The ECU 20 also operates as the second computing unit 44 and the third computing unit 46 while at the same time operating as the first computing unit 42. As the second computing unit 44, the ECU 20 operates to set a correction factor k according to the travel $θ_A$ of the accelerator pedal that has been suddenly operated, with reference to a map (not shown). As the third computing unit 46, the ECU 20 operates to set a filter factor j according to the travel $θ_A$ of the accelerator pedal that has been suddenly operated, with reference to another map (not shown). The correction factor k and filter factor j thus set will be used in the operation of the ECU 20 as the fourth computing unit 48 as explained below.

After operating as the first computing unit 42, second computing unit 44 and the third computing unit 46, the ECU 20 operates as the fourth computing unit 48. When operating as the fourth computing unit 48, the ECU 20 initially calculates an initial throttle opening $θ_k$ by multiplying the provisional target throttle opening θ' set in the first computing unit 42 by the correction factor k. The initial throttle opening $θ_k$ is the initial value of the target throttle opening to be achieved when the accelerator pedal is depressed. In this embodiment, k is set to be smaller than 1 (k<1) when the accelerator pedal travel $θ_A$ is relatively small, and k is set to be equal to 1 (k=1) when the accelerator pedal travel $θ_A$ is relatively large. In another example, k may be set to be smaller than 1 (k<1) when the accelerator pedal travel $θ_A$ is relatively small, and k may be set to 1 when the accelerator pedal travel $θ_A$ is in the vicinity of the middle value, while k may be set to be larger than 1 (k>1) when the accelerator pedal travel $θ_A$ is relatively large.

$$θ_k = kθ' \quad (9)$$

Next, the ECU 20 calculates an amount of change $θ_f$ in the throttle opening by processing a difference (1−k)θ' between the provisional target throttle opening and the initial throttle opening $θ_k$ with the first-order lag filter, according to Eq. (10) as indicated below. In Eq. (10), $θ_f'$ is the last value of the amount of change $θ_f$ in the throttle opening, namely, the amount of change $θ_f$ obtained in the last cycle of processing. The filter factor j corresponds to an inverse of the time constant of the first-order lag filter, and is set to a value that is larger than 0 and smaller than 1, in accordance with the travel $θ_A$ of the accelerator pedal that has been suddenly operated. The amount of change $θ_f$ in the throttle opening calculated according to Eq. (10) represents an amount of change in the target throttle opening after the accelerator pedal is depressed.

$$θ_f = θ_f' + j((1-k)θ' - θ_f') \quad (10)$$

Subsequently, the ECU 20 calculates a target throttle opening θ by adding the amount of change $θ_f$ in the throttle opening to the initial throttle opening $θ_k$, according to Eq. (11) as indicated below.

$$θ = θ_k + θ_f \quad (11)$$

The ECU 20 controls the throttle valve 12 in accordance with the target throttle opening θ calculated in the manner as described above. The result of the throttle control performed by the ECU 20 is shown in FIG. 8. In FIG. 8, changes in the throttle opening (B), torque (C) and the surge tank pressure (D) are plotted against changes in the accelerator pedal travel (A) during acceleration, for comparison between the throttle control according to this embodiment and the conventional throttle control. In FIG. 8, thick solid lines indicate the result of throttle control performed according to this embodiment under soft acceleration (i.e., when the vehicle is slowly accelerated), and thin broken lines indicate the result of the conventional throttle control under soft acceleration.

In the throttle control according to the first embodiment as described above, the throttle valve 12 is controlled on the basis of a change in the surge tank pressure obtained in the virtual intake system model as a target pressure change, so that the initial value of the target throttle opening is corrected in accordance with the virtual surge tank volume coefficient n. In the throttle control according to the second embodiment, on the other hand, the target value (provisional target throttle opening θ') determined from the accelerator pedal travel $\theta_A$ is multiplied by the correction factor k, to be thus directly corrected, and the corrected target value is set as the initial throttle opening $\theta_k$. Thus, the initial torque response to the accelerator pedal operation can be varied through setting of the correction factor k.

When the correction factor k is set to be smaller than 1, namely, when the vehicle is accelerated at a relatively low rate with the accelerator pedal travel being relatively small, the throttle valve 12 is opened, upon depression of the accelerator pedal, by a smaller degree (as indicated by the thick solid line in graph (B) of FIG. 8) than the throttle opening (indicated by the thin broke line in graph (B) of FIG. 8) established under the conventional throttle control. In this manner, the surge tank pressure is prevented from rising sharply immediately after depression of the accelerator pedal, and torque shock can be reduced. In addition, the surge tank pressure begins to change immediately after depression of the accelerator pedal, thus preventing appearance of a substantially no-response time or period during which the torque is not responsive to the accelerator pedal operation.

In the throttle control according to the first embodiment as described above, the throttle valve 12 is controlled on the basis of a change in the surge tank pressure obtained in the virtual intake system model as a target pressure change, so that the throttle opening is gradually changed toward the target value (provisional target throttle opening θ') determined from the accelerator pedal travel $\theta_A$. In the throttle control according to the second embodiment, on the other hand, the difference (1−k)θ' between the provisional target throttle opening θ' and the initial throttle opening $\theta_k$ is processed by means of the first-order lag filter, so that the throttle opening is gradually changed from the initial throttle opening $\theta_k$ to the provisional target throttle opening θ'. According to this control, the rate of change of the torque after the initial response can be varied in a desired manner through setting of the filter factor j.

In the second embodiment, the filter factor j is set in accordance with the accelerator pedal travel $\theta_A$ so as to achieve the rate of change of the torque commensurate with the accelerator pedal travel $\theta_A$. The rate of change of the throttle opening from the initial throttle opening $\theta_k$ to the provisional target throttle opening θ' is reduced as the filter factor j is set to a smaller value (where j>0), and the rate of change of the throttle opening is increased as the filter factor j is set to a larger value (where j<1). By setting the filter factor j to an appropriate value, the surge tank pressure can be increased at a relatively low rate, as shown in FIG. 8. Consequently, the rate of change of the torque following the initial response can be reduced, and torque shock can be reduced.

Other Embodiments

While the invention has been described with reference to the illustrated embodiments, it is to be understood that the invention is not limited to the exemplary embodiments or constructions, but may be otherwise embodied with various changes, modifications or equivalent arrangements, without departing from the spirit and scope of the invention. For example, the illustrated embodiments may be modified, for example, in the manners as described below.

While the virtual surge tank volume coefficient n is set in accordance with the accelerator pedal travel $\theta_A$ in the first embodiment, the virtual surge tank volume coefficient n may be set in accordance with operating conditions of the vehicle other than the accelerator pedal travel, which conditions include, for example, the operation speed of the accelerator pedal (i.e., the rate of change of the accelerator pedal travel), the change gear ratio of the transmission and the vehicle speed. Similarly, while the correction factor k and filter factor j are set in accordance with the accelerator pedal travel $\theta_A$ in the second embodiment, the correction factor k and filter factor j may be set in accordance with the operation speed of the accelerator pedal, the change gear ratio of the transmission, the vehicle speed, or the like.

The throttle control according to each of the illustrated embodiments may be applied to an engine equipped with a supercharger, as well as the naturally aspirated engine as shown in FIG. 1. While the pressure $P_{IN}$ upstream of the throttle valve 12 is measured from a signal of the upstream intake air pressure sensor 32 in the first embodiment, the upstream intake air sensor 32 may be omitted in the case of a naturally aspirated engine, and the atmospheric pressure closely analogous to the upstream intake air pressure $P_{IN}$ may be used instead.

While the cylinder intake mass airflow $m_v$ is estimated from the engine speed and other parameters in the first embodiment, an air flow meter may be provided in each of the intake pipes that connect the surge tank 6 with the respective cylinders, and the cylinder intake mass airflow $m_v$ may be measured from signals of the respective air flow meters. In another modified example, the amount of exhaust gas discharged from the engine body 2 into the exhaust passage 8 may be measured, and the cylinder intake mass airflow $m_v$ may be estimated from the amount of exhaust gas.

The throttle control according to the second embodiment may be applied to an engine in which no surge tank is provided downstream of the throttle valve. For example, the throttle control of the second embodiment may be applied to an engine in which a throttle valve is provided for each cylinder in the vicinity of the intake port of the corresponding cylinder. The throttle control may also be applied to an engine having a variable valve drive mechanism or valve train capable of changing a lift of each intake valve, namely, an engine capable of controlling the intake mass airflow through control of a lift of each intake valve. In this case, the variable valve drive mechanism corresponds to the throttle valve, and the lift corresponds to the throttle opening.

The invention claimed is:

1. A control system for an internal combustion engine, comprising:

an accelerator operation amount sensor that measures an operation amount of an accelerator, target throttle opening calculating means for calculating a target value of a throttle opening in accordance with the accelerator operation amount, a sudden operation detector that detects a sudden operation of the accelerator, an operating condition detector that detects at least one operating condition of the vehicle, and a throttle controller that sets a corrected target value obtained by correcting the target value in accordance with the at least one operating condition of the vehicle as an initial value when a sudden operation of the accelerator is detected, and gradually changing the throttle opening from the corrected target value as the initial value to the target value, wherein the throttle controller:

measures or estimates an actual pressure in a surge tank, and measures or estimates a cylinder intake mass airflow as an amount of air drawn from the surge tank into cylinders of the engine;

calculates a target pressure change in the surge tank according to the target value of the throttle opening, on the basis of the measured or estimated actual surge tank pressure and the cylinder intake mass airflow, using a relationship between the throttle opening and a pressure change in the surge tank in a virtual intake system model having a virtual surge tank volume, and sets the virtual surge tank volume in accordance with the at least one operating condition of the vehicle, wherein, upon detection of a sudden operation of the accelerator, the throttle controller controls the throttle opening in accordance with the measured or estimated surge tank pressure and the cylinder intake mass airflow, so as to provide the target pressure change in the surge tank under a condition of an actual volume of the surge tank, thereby to gradually change the throttle opening from the initial value determined depending on the virtual surge tank volume to the target value.

2. A control system as defined in claim 1, wherein the throttle controller also measures or estimates an intake air pressure at a location upstream of a throttle valve, and controls the throttle opening in view of the measured or estimated upstream intake air pressure.

3. A control system as defined in claim 1, wherein the throttle controller calculates the corrected target value by multiplying the target value by a correction factor that is set in accordance with the at least one operating condition of the vehicle.

4. A control system as defined in claim 3, wherein the throttle controller gradually changes the throttle opening from the corrected target value to the target value by processing a difference between the target value and the corrected target value by means of a first-order lag filter, while setting a time constant of the first-order lag filter in accordance with the at least one operating condition of the vehicle.

5. A control method for an internal combustion engine, comprising:

measuring an operation amount of an accelerator;

calculating a target value of a throttle opening in accordance with the measured accelerator operation amount;

detecting a sudden operation of the accelerator;

acquiring at least one operating condition of the vehicle;

setting a corrected target value obtained by correcting the target value in accordance with the at least one operating condition of the vehicle as an initial value when a sudden operation of the accelerator is detected; and changing the throttle opening from the correct target value as the initial value to the target value gradually, wherein, in the step of changing the throttle opening:

an actual pressure in a surge tank is measured or estimated, a cylinder intake mass airflow as an amount of air drawn from the surge tank into cylinders of the engine is measured or estimated, a target pressure change in the surge tank according to the target value of the throttle opening is calculated on the basis of the measured or estimated actual surge tank pressure and the cylinder intake mass airflow, using a relationship between the throttle opening and a pressure change in the surge tank in a virtual intake system model having a virtual tank volume, and the virtual surge tank volume is set in accordance with the at least one operating condition of the vehicle, wherein, upon detection of a sudden operation of the accelerator, the throttle opening is controlled in accordance with the measured or estimated surge tank pressure and the cylinder intake mass airflow, so as to provide the target pressure change in the surge tank under a condition of an actual volume of the surge tank, thereby to gradually change the throttle opening from the initial value determined depending on the virtual surge tank volume to the target value.

* * * * *